United States Patent
Tanioka et al.

(10) Patent No.: US 12,018,740 B2
(45) Date of Patent: Jun. 25, 2024

(54) STRAIN WAVE GEARING

(71) Applicant: HARMONIC DRIVE SYSTEMS INC., Tokyo (JP)

(72) Inventors: Nozomu Tanioka, Azumino (JP); Jun Handa, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/170,580

(22) Filed: Feb. 17, 2023

(65) Prior Publication Data

US 2024/0044401 A1 Feb. 8, 2024

(30) Foreign Application Priority Data

Aug. 2, 2022 (JP) ................. 2022-123601

(51) Int. Cl.
 *F16H 49/00* (2006.01)
 *F16H 57/00* (2012.01)

(52) U.S. Cl.
 CPC ... *F16H 49/001* (2013.01); *F16H 2057/0056* (2013.01); *F16H 2057/0062* (2013.01)

(58) Field of Classification Search
 CPC .......... F16H 49/001; F16H 2057/0056
 See application file for complete search history.

(56) References Cited

U.S. PATENT DOCUMENTS

| | | | | |
|---|---|---|---|---|
| 3,435,501 A | * | 4/1969 | Paul | F16H 49/001 |
| | | | | 29/725 |
| 2015/0107388 A1 | * | 4/2015 | Yajima | F16H 57/023 |
| | | | | 29/893.1 |

FOREIGN PATENT DOCUMENTS

| | | |
|---|---|---|
| JP | 3187367 U | 11/2013 |
| JP | 2014074450 A | 4/2014 |

* cited by examiner

*Primary Examiner* — Jake Cook
(74) *Attorney, Agent, or Firm* — BUCHANAN INGERSOLL & ROONEY PC

(57) ABSTRACT

A strain wave gearing has three components and a temporary-fixing jig, three components being an internally toothed gear, a cup-shaped externally toothed gear, and a wave generator. The temporary-fixing jig is securely fastened to an output shaft fixed to the externally toothed gear by a temporary-fixing bolt and is securely fastened to an input shaft fixed to a cam plate of the wave generator by a temporary-fixing bolt. The temporary-fixing jig engages with the output shaft and the input shaft and maintains the three components in an assembled state. There is no need for an operation for adjusting the positions of the three components in an operation for attaching the strain wave gearing to a motor. After the strain wave gearing has been attached to the motor, the temporary-fixing jig is removed from the strain wave gearing, wherefore less space is required for installation.

4 Claims, 3 Drawing Sheets

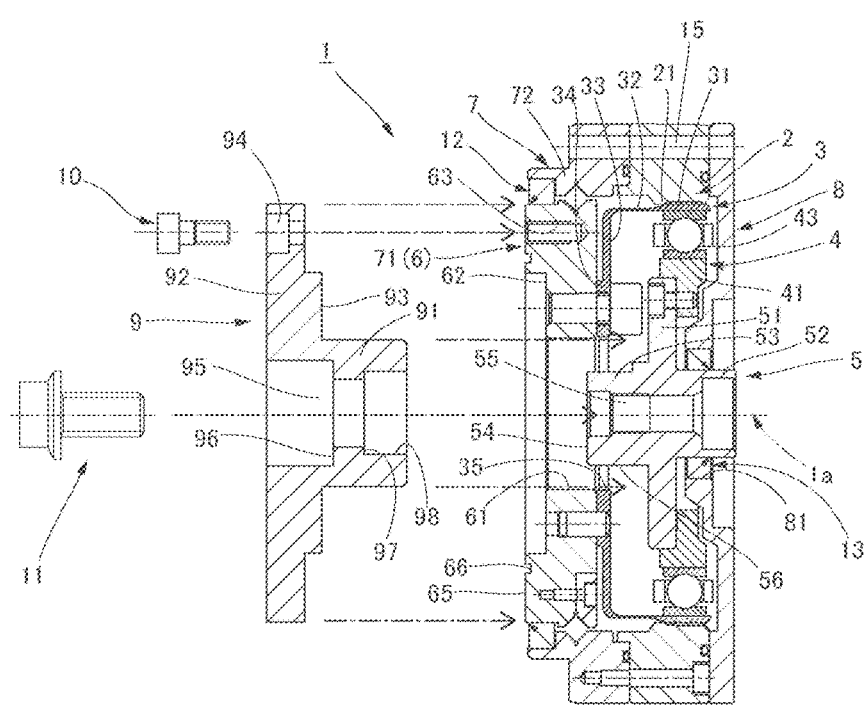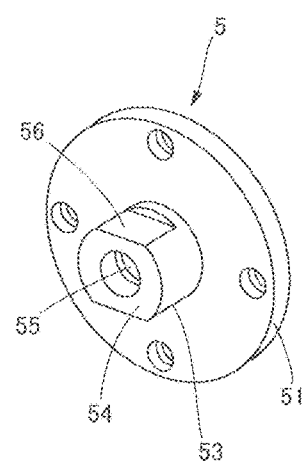
FIG. 2 (A)
FIG. 2 (B)

STRAIN WAVE GEARING

TECHNICAL FIELD

The present invention relates to a strain wave gearing that is provided to a user in a unitary state in which three components are assembled: an internally toothed gear, an externally toothed gear, and a wave generator.

BACKGROUND ART

A strain wave gearing is fundamentally configured from three components: a rigid internally toothed gear, a flexible externally toothed gear, and a wave generator. An operation for attaching the wave generator to a motor shaft and an operation for incorporating the wave generator attached to the motor shaft inside the externally toothed gear, which is assembled in the internally toothed gear, are included in an operation for assembling the strain wave gearing. It is also necessary to carry out an operation in which the incorporated wave generator is centered and positional adjustment such as axial-direction positioning is carried out. There are cases where a strain wave gearing is provided to a user in a unitary state in which the three components are assembled and positionally adjusted in advance so as to make it possible for the operation for assembling the strain wave gearing to be easily carried out on the user side.

Such a unitary product is proposed in, e.g., Patent Literature 1 and 2. The strain wave gearing unit disclosed in Patent Literature 1 is configured as a hermetically sealed structure provided with an input shaft supported by a bearing mechanism so that the strain wave gearing unit can easily be assembled in a motor or the like. The state in which the three components are assembled is maintained by the bearing mechanism, and positional misalignment of the wave generator during product transport, etc., damage to an oil seal or other components in association with such misalignment, and other adverse events are prevented.

PRIOR-ART LITERATURE

Patent Literature

Patent Literature 1: JP 2014-74450 A
Patent Literature 2: JPU 3187367 Y

SUMMARY OF THE INVENTION

Problems to be Solved by the Invention

In a strain wave gearing in which the three components are assembled in advance to form a unit, a bearing mechanism or other support mechanism is incorporated in order to maintain the three components in an assembled state, particularly a state in which the wave generator is assembled in the externally toothed gear. Additionally, a joint mechanism or the like is incorporated so that the strain wave gearing can easily be attached to a motor shaft or the like. Incorporating the support mechanism, joint mechanism, etc., yields a commensurate increase in the dimensions and weight of the unit-formed strain wave gearing, which necessitates a larger space for installation, increases rotation loss, raises manufacturing costs, and presents other problems to be overcome.

In view of such circumstances, it is a primary object of the present invention to provide a strain wave gearing provided with a small and compact mechanism that makes it possible to maintain a state in which components are assembled, the strain wave gearing being configured to allow less space to be required for installation.

Means of Solving the Problems

In order to solve the abovementioned problems, the strain wave gearing according to the present invention is configured such that a state in which constituent components are assembled is maintained using a temporary-fixing jig until the strain wave gearing is attached to a motor or other device to which attachment is to be made, and such that the temporary-fixing jig can be removed after the strain wave gearing has been attached to the device to which attachment is to be made.

Additionally, in the strain wave gearing according to the present invention, operations for attaching and removing the temporary-fixing jig, and an operation for attaching an input shaft to a motor shaft, can all be carried out from the output side, where an input side is the side where the strain wave gearing is attached to the motor to which attachment is to be made, and the output side is the other side.

Furthermore, the strain wave gearing according to the present invention is configured such that a mounting part of a temporary-fixing bolt for securely fastening the temporary-fixing jig to the input shaft of the strain wave gearing is used, a shaft-fastening fixing bolt is mounted instead of the temporary-fixing bolt, and the input shaft of the strain wave gearing can be securely fastened to a rotating shaft (motor shaft) of the device to which attachment is to be made.

In the strain wave gearing according to the present invention, the three constituent components of the strain wave gearing, particularly the internally toothed gear, the externally toothed gear, and the wave generator, are maintained in the assembled state by the temporary-fixing jig. No positional misalignment occurs between the three components during, inter alia, transport of the strain wave gearing, avoiding adverse events such as unnecessary loads being applied to other constituent components such as an oil seal due to positional misalignment.

The need for an operation for adjusting the positions of the three components is essentially obviated in the operation for attaching the strain wave gearing to the device to which attachment is to be made, and the attachment operation is facilitated. The temporary-fixing jig for maintaining the state in which the three components are assembled is removed from the strain wave gearing attached to the device to which attachment is to be made. Less space is required for installation, which is advantageous for reducing the size of the entire device and making the device more compact. This is also useful because the operation for attaching the strain wave gearing and the operation for removing the temporary-fixing jig can be carried out from the same direction.

Furthermore, a shaft-fastening bolt used in order to securely fasten the input shaft to a motor shaft to which attachment is to be made can be mounted instead of the temporary-fixing bolt by which the temporary-fixing jig is securely fastened to the input shaft of the strain wave gearing. A joint mechanism for attaching the input shaft to the motor shaft can be reduced in size and made more compact.

BRIEF DESCRIPTION OF THE DRAWINGS

FIG. 2(A) is a schematic longitudinal cross-sectional view of a strain wave gearing in a state in which a temporary-fixing jig is removed, and FIG. 2(B) is a perspective view of an input shaft.

MODE FOR CARRYING OUT THE INVENTION

Figure 1A:
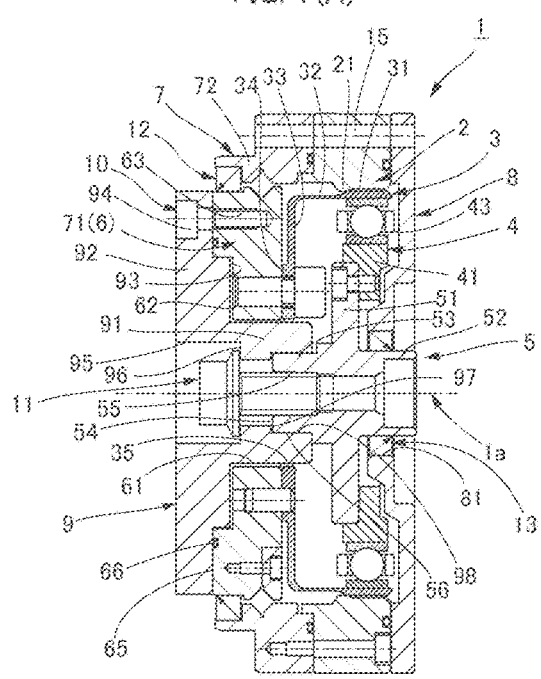
FIG. 1(A) is a schematic longitudinal cross-sectional view of a strain wave gearing to which the present invention is applied.
Figure 1B:
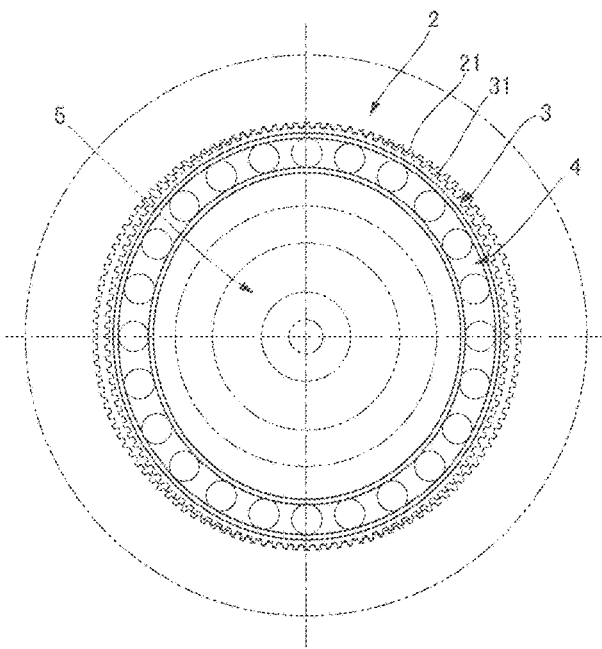
FIG. 1(B) is an explanatory diagram showing a state of meshing of an internally toothed gear and an externally toothed gear.

An embodiment of a strain wave gearing to which the present invention is applied is described below with reference to FIGS. 1 and 2. The strain wave gearing 1 is provided with a rigid internally toothed gear 2, a cup-shaped flexible externally toothed gear 3 arranged coaxially inside the internally toothed gear 2, a wave generator 4 arranged coaxially inside the externally toothed gear 3, an input shaft 5 coaxially fixed to the wave generator 4, an output shaft 6 coaxially fixed to the externally toothed gear 3, a primary bearing 7 for supporting the output shaft 6 (externally toothed gear 3) in a state that allows rotation relative to the internally toothed gear 2, and an end plate 8. The strain wave gearing 1 is additionally provided with a temporary-fixing jig 9 by which the internally toothed gear 2, the externally toothed gear 3, and the wave generator 4, which are in a state of being assembled and positioned with respect to one another, are held in the positioned state. The temporary-fixing jig 9 is securely fastened to the output shaft 6 by a plurality of temporary-fixing bolts 10 and is securely fastened to the input shaft 5 by a single temporary-fixing center bolt 11. In the description below, with respect to an axial direction that follows a central axis 1a of the strain wave gearing 1, the side where the end plate 8 is positioned is referred to as an axial-direction input side, and the side where the temporary-fixing jig 9 is positioned is referred to as an axial-direction output side.

The internally toothed gear 2 is an annular member of rectangular cross-section, internal teeth 21 being formed on the circular inner peripheral surface of the internally toothed gear 2. The externally toothed gear 3 is provided with a radially flexible cylindrical barrel part 32 on which external teeth 31 capable of meshing with the internal teeth 21 of the internally toothed gear 2 are formed, a diaphragm 33 extending radially inward from the rear end of the cylindrical barrel part 32, and an annular rigid boss 34 formed on the inner peripheral edge of the diaphragm 33. The wave generator 4 is provided with an annular rigid cam plate 41, and a wave-generator bearing 43 mounted on an ellipsoidal outer peripheral surface (non-circular outer peripheral surface) of the cam plate 41. The wave generator 4 is fitted into the cylindrical barrel part 32 of the externally toothed gear 3 and causes the cylindrical barrel part 32 to flex into an ellipsoidal shape, causing the external teeth 31 to partially mesh with the internal teeth 21.

The input shaft 5 extends through a central hole in the cam plate 41 of the wave generator 4. The input shaft 5 is a hollow shaft, a discoid flange 51 being formed integrally with the outer peripheral surface of the input shaft 5. The cam plate 41 of the wave generator 4 is securely fastened coaxially to an outer peripheral edge part of the discoid flange 51. In the present example, the input shaft 5 is a separate member from the cam plate 41, but it is also possible to use a single component in which the cam plate 41 and the input shaft 5 are integrated.

The output shaft 6 is securely fastened coaxially to the annular boss 34 of the externally toothed gear 3 from the axial-direction output side. The output shaft 6 is a discoid member provided with a central hole 61 of the same diameter as a central hole 35 in the boss 34. The primary bearing 7 is arranged on the outer peripheral side of the output shaft 6. The primary bearing 7 is formed from cross-roller bearings, an inner race 71 of the primary bearing 7 being formed integrally with the output shaft 6. The inner race 7a can also be produced as a separate component from the output shaft 6 and securely fastened coaxially to an outer peripheral part of the output shaft 6. An outer race 72 of the primary bearing 7 is positioned on the axial-direction output side of the internally toothed gear 2 and is securely fastened coaxially to the internally toothed gear 2. Rollers are rollably inserted into a raceway groove formed between the inner race 71 (output shaft 6) and the outer race 72. A gap that is located between the inner race 71 (output shaft 6) and the outer race 72 and that is opened on the axial-direction output side is sealed by an output-side oil seal 12. The end plate 8 is positioned on the axial-direction input side of the internally toothed gear 2 and securely fastened to the internally toothed gear 2. An input-side shaft end section 52 of the input shaft 5 protrudes toward the axial-direction input side through a central hole 81 in the end plate 8. A gap between the outer peripheral surface of the input shaft 5 and the inner peripheral surface of the central hole in the end plate 8 is sealed by an input-side oil seal 13.

The temporary-fixing jig 9 is arranged on the axial-direction output side relative to the output shaft 6. The temporary-fixing jig 9 is provided with a cylinder part 91 of a size that enables insertion into the central hole 61 in the output shaft 6, and a discoid flange 92 that extends radially outward from the output-side end section of the cylinder part 91. The outside diameter of the flange 92 and the outside diameter of the output shaft 6 are substantially equal. The end surface of the flange 92 that faces the output shaft 6 is a step end surface 93 in which an inner-peripheral-side portion protrudes toward the output shaft 6. The step end surface 93 assumes a form that is complementary to an output-side step end surface 62 of the output shaft 6.

Bolt holes 94 for attaching the temporary-fixing bolts 10 are formed in a flange outer-peripheral edge portion of the temporary-fixing jig 9. The bolt holes 94 are arranged at given angular intervals in a circumferential direction and pass axially through the flange outer-peripheral edge portion. In the present example, two bolt holes 94 are formed. Bolt-threading holes 63 that extend in the axial direction are opened in an outer peripheral edge part of the step end surface 62 of the output shaft 6 at sites that correspond to the bolt holes 94. The temporary-fixing jig 9 is securely fastened coaxially to the output shaft 6 by the temporary-fixing bolts 10 threaded and fixed in the bolt-threading holes 63 via the bolt holes 94 from the axial-direction output side.

A circular central hole 95 in the cylinder part 91 of the temporary-fixing jig 9 is a bolt hole into which the temporary-fixing center bolt 11 can be inserted from the axial-direction output side. An axially medial section of the circular central hole 95 is formed as a small-diameter circular inner peripheral surface portion, and an annular step surface 96 that faces the axial-direction output side and an annular step surface 97 that faces the axial-direction input side are formed in the circular central hole 95. A head part of the temporary-fixing center bolt 11 is capable of engaging with the annular step surface 96. An output-side shaft end section 53 of the input shaft 5 is coaxially inserted into the circular central hole 95 from the axial-direction input side.

A central hole portion in the output-side shaft end section 53 is formed as a bolt-threading hole 55 in which the temporary-fixing center bolt 11 can be threaded and fixed. The temporary-fixing jig 9 is securely fastened coaxially to the input shaft 5 by the temporary-fixing center bolt 11 threaded and fixed in the bolt-threading hole 55 via the circular central hole 95 from the axial-direction output side.

A distal-end surface 54 of the output-side shaft end section 53 of the input shaft 5 contacts the annular step surface 97 (axial-direction positioning surface) of the circular central hole 95 in the temporary-fixing jig 9, whereby the axial-direction position of the input shaft 5 is fixed. An outer peripheral surface 56 of the output-side shaft end section 53 of the input shaft 5 is formed in a D-cut shape in which two diameter-direction portions of the circular outer peripheral surface are cut so as to be flat, as shown in FIG. 2(B). An input-side inner-peripheral surface 98 (rotation-direction positioning surface) of the circular central hole 95 in the temporary-fixing jig 9 is formed in a D-cut shape that is complementary to that of the outer peripheral surface 56 of the input shaft 5, two diameter-direction portions of the circular inner-peripheral surface jutting inward and being flat. The rotation-direction position of the input shaft 5 is fixed by a rotation-stopping mechanism configured in this manner.

Thus, by securely fastening the temporary-fixing jig 9 to the input shaft 5 and the output shaft 6, the state in which the wave generator 4 attached to the input shaft 5 is assembled in the externally toothed gear 3 attached to the output shaft 6 is maintained, and the state of meshing of the externally toothed gear 3 and the internally toothed gear 2 caused by the wave generator 4 is also maintained. Thus, the state in which the three components are assembled is maintained during, inter alia, transport of the strain wave gearing 1, and it is possible to avoid adverse events such as excessive loads being applied to components such as the input-side oil seal 13 due to axial-direction positional misalignment, axial misalignment, tilting, or the like. Additionally, because the assembly state is maintained, there is no need for an operation for adjusting the positions of components within the operation for attaching the strain wave gearing to a motor or other device to which attachment is to be made, therefore making it possible to easily carry out the attachment operation.

(Jig Removal Procedure)

FIGS. 3(A) to 3(D) are explanatory diagrams illustrating a procedure for removing the temporary-fixing jig 9 when the strain wave gearing 1, having been conveyed into an installation location in a state in which the temporary-fixing jig 9 is attached thereto, is attached to a device to which attachment is to be made, e.g., a motor.

Figure 3:
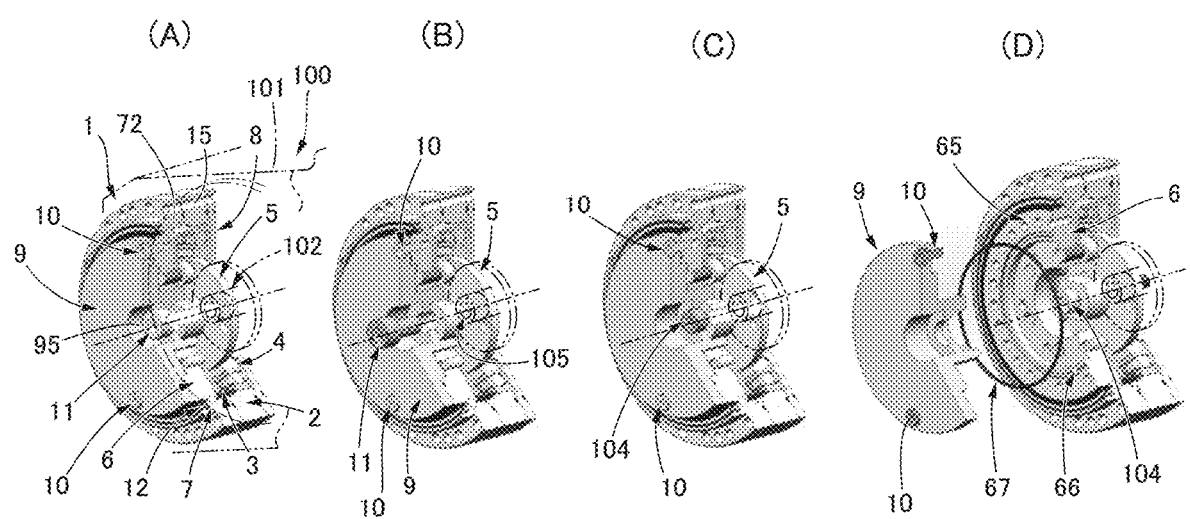
FIGS. 3(A) to 3(D) are explanatory diagrams illustrating a procedure for removing the temporary-fixing jig.

First, as shown in FIG. 3(A), the strain wave gearing 1 in the state in which the temporary-fixing jig 9 is attached thereto is attached to a motor housing 101 of a motor 100 to which attachment is to be made. The end plate 8 defining the input-side end surface of the strain wave gearing 1 is positioned on the motor housing 101 (motor-side attachment flange). Fastening bolts (not shown) are passed through bolt holes 15 extending through the end plate 8, the internally toothed gear 2, and the outer race 72 of the primary bearing 7, which constitutes a device housing of the strain wave gearing 1; and the strain wave gearing 1 is attached to the motor housing 101. A shaft-distal-end section of a motor shaft 102 is coaxially inserted into a central hole in the input-side shaft end section 52 of the input shaft 5 of the strain wave gearing 1. A bolt-threading hole 105, into which a shaft-fastening center bolt 104 for securely fastening the motor shaft 102 to the input shaft 5 of the strain wave gearing 1 can be threaded, is opened in the distal-end surface of the shaft-distal-end section of the motor shaft 102.

On the axial-direction output side of the strain wave gearing 1, the head part of the temporary-fixing center bolt 11 is exposed on the axial-direction output side within the circular central hole 95 in the temporary-fixing jig 9 attached to the axial-direction output side of the strain wave gearing 1. As shown in FIG. 3(B), the temporary-fixing center bolt 11 is removed, and the secure fastening of the temporary-fixing jig 9 and the input shaft 5 is released.

Next, the input shaft 5 of the strain wave gearing 1 is securely fastened to the motor shaft 102 by using the shaft-fastening center bolt 104 instead of the temporary-fixing center bolt 11. As shown in FIG. 3(C), on the axial-direction output side of the strain wave gearing 1, the shaft-fastening center bolt 104 is threaded into the bolt-threading hole 105, which is formed in the shaft-distal-end section of the motor shaft 102, from the axial-direction output side of the strain wave gearing 1 via the circular central hole 95 in the temporary-fixing jig 9. The input shaft 5 of the strain wave gearing 1 is securely fastened coaxially to the motor shaft 102. As a result, the strain wave gearing 1 is attached to the motor 100 while the state in which the three components are assembled is maintained by the temporary-fixing jig 9. There is no need for an operation for adjusting the positions of the externally toothed gear 3 and the wave generator 4 within the attachment operation.

Finally, as shown in FIG. 3(D), on the axial-direction output side of the strain wave gearing 1, the temporary-fixing bolts 10 securely fastening the temporary-fixing jig 9 to the output shaft 6 are loosened, and the temporary-fixing jig 9 is removed from the output shaft 6 toward the axial-direction output side. An O-ring groove 66 is formed in the output-side step end surface 62 of the output shaft 6 of the strain wave gearing 1, and an O-ring 67 is incorporated within the O-ring groove 66. A load-side member (not shown) is attached to the output-side end surface 65 of the output shaft 6, sandwiching the O-ring 67.

As described above, in the strain wave gearing 1 according to the present example, constituent components including three components, i.e., the internally toothed gear 2, the externally toothed gear 3, and the wave generator 4, are maintained in an assembled state by the temporary-fixing jig 9 until the strain wave gearing 1 is attached to the motor 100. Thus, it is unnecessary to adjust the positions of the three components when attaching the strain wave gearing 1 to the motor 100, and the attachment operation is simplified.

Because it is not necessary to incorporate, inter alia, a bearing mechanism for maintaining the position at which the wave generator 4 is attached to the externally toothed gear 3 into the strain wave gearing 1, a unit structure is obtained in which it is easy to reduce the inertia of the input shaft 5. The temporary-fixing jig 9 for maintaining the assembly state is removed after the strain wave gearing 1 has been attached to the motor 100. Thus, less space is required for installation, which is advantageous for reducing the size and weight of the entire device to which the strain wave gearing 1 is attached and making the device more compact.

For example, in the input shaft 5 to which the cam plate 41 (wave plug) of the wave generator 4 shown in FIG. 2(B) is attached, eliminating the output-side shaft end section 53 protruding toward the axial-direction output side makes it possible to further improve the flatness and reduce the weight (reduce the inertia) of the input shaft 5. In this configuration, a recess provided with a D-cut-shaped inner peripheral surface of prescribed depth is formed on the output-side end surface of the input shaft 5. The cylinder part 91 of the temporary-fixing jig 9 is preferably configured as a portion provided with a D-cut-shaped outer peripheral surface capable of fitting into the recess.

Additionally, in the strain wave gearing according to the present example, the input shaft 5 and the motor shaft 102 are securely fastened by the shaft-fastening center bolt 104 instead of the temporary-fixing center bolt 11. This is advantageous for reducing the size of the strain wave gearing 1 and making the strain wave gearing 1 more compact to a greater extent than when a shaft coupling, a spline shaft, or another shaft joint mechanism is incorporated.

Furthermore, the operation for attaching the strain wave gearing 1 to the motor 100 and the operation for removing the temporary-fixing jig 9 can be carried out from the same side (axial-direction output side) relative to the strain wave gearing 1. Thus, it is easy to carry out the operation for attaching the strain wave gearing 1 to the motor 100, and it is possible to easily assemble the strain wave gearing 1 automatically on the user side.

In addition, the strain wave gearing 1 according to the present example is configured as a hermetically sealed unit provided with the input-side oil seal 13 and the output-side oil seal 12. It is not necessary to arrange a hermetic-sealing component (oil seal, etc.) on the side of the motor 100 to which attachment is to be made. It is also possible to set a structure on the input-shaft 5 side of the wave generator 4 of the strain wave gearing 1, in conformance with a shaft-fastening structure on the motor-shaft 102 side.

The invention claimed is:

1. A strain wave gearing comprising:
a rigid internally toothed gear;
a cup-shaped flexible externally toothed gear arranged coaxially inside the internally toothed gear;
a wave generator arranged coaxially inside the externally toothed gear; and
a bearing for supporting the externally toothed gear in a state that allows rotation relative to the internally toothed gear,
wherein
the externally toothed gear has:
a radially flexible cylindrical barrel part on which external teeth capable of meshing with internal teeth of the internally toothed gear are formed;
a diaphragm extending radially inward from one end of the cylindrical barrel part; and
a rigid boss formed on an inner peripheral edge of the diaphragm,
the wave generator being provided with a rigid cam plate provided with an input shaft, and a wave-generator bearing mounted on a non-circular outer peripheral surface of the cam plate,
the wave generator is fitted into the cylindrical barrel part of the externally toothed gear, causing the cylindrical barrel part to radially flex, and causing the external teeth to partially mesh with the internal teeth,
the bearing has an outer race that is coaxially fixed to the internally toothed gear, and an inner race provided with an output shaft that is coaxially fixed to the boss of the externally toothed gear, and
the wave generator is arranged on an axial-direction input side, which is one side in an axial direction, and the output shaft is arranged on an axial-direction output side, which is the other side in the axial direction, the wave generator and the output shaft sandwiching the boss of the externally toothed gear therebetween,
the strain wave gearing further comprising:
a temporary-fixing jig for holding three members, which are the internally toothed gear, the externally toothed gear, and the wave generator, in a prescribed assembly state; and
a first temporary-fixing bolt and a second temporary-fixing bolt,
wherein
the input shaft has:
an input-side shaft end section that is securely fastened to a motor shaft to which attachment is to be made; and
an output-side shaft end section that is securely fastened to the temporary-fixing jig,
the temporary-fixing jig has:
a discoid flange positioned on the axial-direction output side relative to the output shaft;
a cylinder part protruding toward the axial-direction input side through a central hole in the output shaft and a central hole in the boss from the discoid flange; and
a hollow section extending through the discoid flange and the cylinder part,
the cylinder part has:
an axial-direction positioning surface that engages with the output-side shaft end section of the input shaft, to thereby define an axial-direction position of the wave generator relative to the externally toothed gear; and
a rotation-direction positioning surface that engages with the output-side shaft end section of the input shaft, to thereby define a rotation-direction position of the wave generator relative to the externally toothed gear; and
the temporary-fixing jig is
securely fastened coaxially to the output shaft by the first temporary-fixing bolt attached to the discoid flange from the axial-direction output side, and
is securely fastened coaxially to the output-side shaft end section of the input shaft by the second temporary-fixing bolt mounted in the hollow section from the axial-direction output side.

2. The strain wave gearing according to claim 1, wherein:
the axial-direction positioning surface is an annular step surface that faces the axial-direction input side and that is formed on an inner peripheral surface of the hollow section in the temporary-fixing jig;
a distal-end surface of the input-side shaft end section of the input shaft inserted into the hollow section contacts the annular step surface;
the rotation-direction positioning surface is formed on the input-side inner peripheral surface of the hollow section in the temporary-fixing jig, and part of the circular inner peripheral surface assuming a form of jutting radially inward; and
an outer peripheral surface of the input-side shaft end section of the input shaft inserted into the hollow section assumes a form that is complementary to that of the rotation-direction positioning surface.

3. The strain wave gearing according to claim 1, further comprising:
a shaft-fastening bolt that can be mounted in the hollow section after the second temporary-fixing bolt has been removed, in order to securely fasten the input-side shaft end section of the input shaft to a motor shaft to which attachment is to be made.

4. The strain wave gearing according to claim 1, further comprising:
an end plate fixed to the internally toothed gear from the axial-direction input side;
an input-side oil seal; and an output-side oil seal,
wherein
the input-side shaft end section of the input shaft protrudes toward the axial-direction input side through a central hole in the end plate, and a gap between the inner peripheral surface of the central hole in the end plate and the outer peripheral surface of the input-side shaft end section is sealed by the input-side oil seal, and
a gap that is opened on the axial-direction output side and that is formed between the outer race and the inner race of the primary bearing is sealed by the output-side oil seal.

\* \* \* \* \*